(12) United States Patent
Goodman et al.

(10) Patent No.: US 8,746,068 B2
(45) Date of Patent: Jun. 10, 2014

(54) ULTRASONICALLY CONTROLLABLE GREASE DISPENSING TOOL

(75) Inventors: Mark A. Goodman, Cortlandt, NY (US); William Bishop, Pleasantville, NY (US); Gary Mohr, Cortlandt, NY (US)

(73) Assignee: U.E. Systems, Inc., Elmsford, NY (US)

( * ) Notice: Subject to any disclaimer, the term of this patent is extended or adjusted under 35 U.S.C. 154(b) by 374 days.

(21) Appl. No.: 13/088,212

(22) Filed: Apr. 15, 2011

(65) Prior Publication Data

US 2011/0253480 A1 Oct. 20, 2011

Related U.S. Application Data

(60) Provisional application No. 61/325,194, filed on Apr. 16, 2010.

(51) Int. Cl.
*G01N 29/00* (2006.01)
(52) U.S. Cl.
USPC .................. 73/593; 73/658; 184/6.1; 184/6.4; 118/679
(58) Field of Classification Search
USPC .............. 73/593, 660, 644, 658, 587; 184/36; 118/677, 679, 694
See application file for complete search history.

(56) References Cited

U.S. PATENT DOCUMENTS

| | | | | |
|---|---|---|---|---|
| 3,674,112 A | * | 7/1972 | Roberts | 184/6.1 |
| 3,952,566 A | * | 4/1976 | Jacobson | 73/10 |
| 4,152,598 A | * | 5/1979 | Stewart | 250/391 |
| 4,635,042 A | * | 1/1987 | Andrews | 340/605 |
| 4,738,336 A | * | 4/1988 | Smith et al. | 184/6.4 |
| 4,788,932 A | * | 12/1988 | Kullman et al. | 118/211 |
| 4,800,512 A | * | 1/1989 | Busch | 702/182 |
| 4,987,769 A | | 1/1991 | Peacock et al. | |
| 5,021,665 A | * | 6/1991 | Ames | 250/357.1 |
| 5,080,195 A | * | 1/1992 | Mizumoto et al. | 184/6.4 |
| RE33,977 E | | 6/1992 | Goodman et al. | |
| 5,140,858 A | * | 8/1992 | Nishimoto et al. | 73/587 |
| 5,350,040 A | * | 9/1994 | Gribble | 184/105.2 |
| 5,691,707 A | * | 11/1997 | Smith et al. | 340/682 |
| 5,950,588 A | * | 9/1999 | Kusche et al. | 123/196 R |
| 5,955,670 A | * | 9/1999 | Goodman et al. | 73/592 |
| 6,122,966 A | * | 9/2000 | Goodman et al. | 73/593 |
| 6,216,539 B1 | | 4/2001 | Johnson et al. | |

(Continued)

*Primary Examiner* — Peter Macchiarolo
*Assistant Examiner* — Samir M Shah
(74) *Attorney, Agent, or Firm* — Leason Ellis LLP.

(57) ABSTRACT

A lubrication dispensing apparatus for lubricating a device with moving parts includes a lubricant reservoir, a lubricant dispenser for dispensing lubricant from the lubricant reservoir, an ultrasonic detection module which detects the amplitude of ultrasonic energy emitted by said device when its parts are moving and produces an signal related thereto, and a control module which analyzes the amplitude of the signal from the ultrasonic detection module and, in response to a lubricate signal, causes the lubricant dispenser to automatically dispense lubricant onto the moving parts of the device until the signal from the ultrasonic detector indicates that the ultrasonic energy produced by the device has decreased to a particular level. The control module includes a programmed processor and a storage memory. The memory stores as a base value the value of the detected amplitude of ultrasonic energy when the device is operating properly. After receiving a signal to lubricate the device, the processor causes the dispenser to start the flow of lubricant to the device, compares the signal from the ultrasonic detection module when the parts are moving to the base value, and causes the dispenser to cease the flow of lubricant when the signal substantially decreases.

21 Claims, 8 Drawing Sheets

(56) References Cited

U.S. PATENT DOCUMENTS

| | | |
|---|---|---|
| 6,324,899 B1 * | 12/2001 | Discenzo .................... 73/53.05 |
| 6,339,961 B1 | 1/2002 | Goodman et al. |
| 6,508,128 B2 * | 1/2003 | Bode .............................. 73/593 |
| 6,526,830 B2 * | 3/2003 | Scholl et al. ................... 73/593 |
| 6,561,316 B1 * | 5/2003 | Graf et al. .................... 184/38.4 |
| 6,707,762 B1 | 3/2004 | Goodman et al. |
| 6,777,022 B2 * | 8/2004 | Sekine et al. ..................... 427/8 |
| 6,804,992 B2 | 10/2004 | Goodman et al. |
| 6,996,030 B2 | 2/2006 | Goodman et al. |
| 7,066,027 B2 * | 6/2006 | Dwyer-Joyce et al. ......... 73/579 |
| 8,171,796 B2 * | 5/2012 | Ueno et al. ...................... 73/587 |
| 2001/0023795 A1 | 9/2001 | Sekine et al. |
| 2004/0090867 A1 | 5/2004 | Goodman et al. |
| 2004/0250623 A1 | 12/2004 | Walker et al. |
| 2006/0061770 A1 | 3/2006 | Erskine |
| 2006/0209632 A1 | 9/2006 | Goodman |
| 2009/0215502 A1 | 8/2009 | Griffin, Jr. |
| 2010/0071998 A1 | 3/2010 | Cerveny |
| 2012/0316796 A1 * | 12/2012 | Goodman et al. ............... 702/39 |

* cited by examiner

ULTRASONICALLY CONTROLLABLE GREASE DISPENSING TOOL

CROSS-REFERENCE TO RELATED APPLICATION

This application is related to and claims the benefit of U.S. Provisional Patent Application Ser. No. 61/325,194 filed Apr. 16, 2010 and entitled ON-BOARD ULTRASONIC FREQUENCY SPECTRUM AND IMAGE GENERATION, the contents of which are incorporated herein by reference in their entirety. This application is also related to U.S. patent application Ser. No. 13/088,195 entitled ON-BOARD ULTRASONIC FREQUENCY SPECTRUM AND IMAGE GENERATION filed concurrently herewith.

BACKGROUND OF THE INVENTION a. Field of the Invention

The invention relates generally to a controllable grease dispersion tool for use in lubricating the bearings, gears or transmission of a device or machine and, more particularly, to a portable grease dispersion tool incorporating a portable ultrasonic detector to detect the condition of motor bearings, gears or transmission as lubrication is applied.

b. Description of the Related Art

Ultrasonic sensors have been used to detect ultrasonic energy generated by friction within mechanical devices, such as that created by deteriorated bearings, as disclosed in U.S. Pat. No. Re. 33,977 to Goodman, et al., the contents of which are hereby incorporated herein by reference in their entirety. The greater the amount of friction, the greater is the intensity of the generated ultrasonic energy. Applying a lubricant to the device reduces friction and consequently the intensity of the generated ultrasound drops. Measuring ultrasonic energy thus provides a way to determine when lubrication has reached the friction generating surfaces. Additionally, faulty devices, such as bearings, generate a higher level of ultrasonic energy than do good bearings and thus, this condition can also be detected.

In the past, decisions have been made on when to lubricate bearings based on the amount of time that has passed since the last application of lubricant and the specific amount of lubricant added at that time. Typically, this information was compared to manufacturer's recommendations. However, a major reason for bearing failure is improper lubrication, not just a failure to lubricate. In particular, over lubrication can be a problem. It is known in the art to combine a lubrication tool with an ultrasonic detector to help control the application of lubricant to bearings. Such devices are disclosed in U.S. Pat. Nos. 6,122,966 and 6,339,961 of Goodman et al., the contents of which are incorporated herein by reference in their entirety.

As indicated in U.S. Published Patent Application US2006/0209632-A of Goodman, the details of which are hereby incorporated herein by reference in their entirety, both motors and electrical discharges in electrical cabinets used in large facilities may be positioned at widely separated locations Since acoustic energy created by faulty bearings is detectable in both the audible and ultrasonic frequency ranges, generally in the range of 28 to 40 kHz, in noisy audible environments, the audible components are too difficult to unaided humans to detect. The ultrasonic component is easily detected and located. Thus, means are typically provided for heterodyning, or demodulating, the detected signal into the audio range, and various schemes are available for doing this.

When using ultrasonic energy to detect leaks, deteriorating bearings, electrical discharges or other malfunctions, it is useful to have a portable ultrasonic sensor which indicates the presence and intensity of ultrasonic energy both visually and audibly. U.S. Pat. No. Re. 33,977 to Goodman et al. discloses an ultrasonic sensor that displays the intensity of the detected signal on an output meter operable in either linear or logarithmic mode, and also provides for audio output through headphones. U.S. Pat. No. 4,987,769 to Peacock et al. discloses an ultrasonic detector that displays the amplitude of the detected ultrasonic signal on a ten-stage logarithmic LED display. However, the detector disclosed in Peacock does not process the detected signal to produce an audible response, nor does it provide for signal attenuation after the initial pre-amplification stage.

A portable device which has been used in the past to detect ultrasonic energy is the UE 10,000 made by U.E. Systems of Elmsford, N.Y. This device is covered by U.S. Pat. Nos. 6,707,762, 6,804,992 and 6,996,030 to Goodman et al, which are incorporated herein by reference in their entirety. The UP 10,000 detects ultrasonic signals from deteriorated bearings and demodulates or heterodynes the signals to the audio range. These signals can then be heard by an operator through headphones as a way of detecting malfunctions. The heterodyned audio signal can be saved and later downloaded to an external spectrum analyzer in order to make more precise determinations of the status of the bearings.

After extended use of the detection equipment, operators often tend to begin to use their ears as a guide to the condition of the motor bearings, as opposed to the amplitude readings on the display of the ultrasonic device. However, it is extremely difficult for a person to discern with their ears the differences between inputs that are representative of bearings just beginning to deteriorate and those which are more seriously deteriorated. The use of the human ear is a highly unreliable way in which to predict faults. By delivering the heterodyned signal to an external spectrum analyzer, this can be overcome. The difficulty is that the motors with bearings under test can be spread out over large distances. By the time all of the motors have been surveyed, the portable detector has been returned to a maintenance facility and the stored heterodyned audio signals are downloaded to a spectrum analyzer, bearings which are marginal may fail. Complete failure of the bearings can leave a motor inoperable for a period of time. In some instances, it is very detrimental to have a motor out of service for even a small amount of time, e.g., a cooling pump.

In addition to ultrasonic detection apparatus, the UP15000 also includes a camera with which images of the machine under test can be recorded. This is useful in locating and identifying a particular motor which has a bearing problem.

It would be advantageous if a grease dispersion tool combined with a portable ultrasonic detector had the on-board capability to perform spectrum analysis on received signals. This would eliminate the time delay between a reading and confirmation of the detection of an impending fault and administering sufficient lubricant to prevent said fault.

SUMMARY OF THE INVENTION

The present invention is directed to improved apparatus and methods for using a portable handheld ultrasonic detector with on-board spectrum analysis that can be utilized in one embodiment to assist in the control of a grease dispersion tool for use in lubricating the bearings of a machine and detecting deteriorating bearings, gear boxes and mechanical transmissions where the machines are at widely separated locations.

Prior art portable hand-held ultrasonic detectors are equipped with analog detector circuits for detecting ultrasonic signals generated by deteriorating bearings, and discharging electrical components. These ultrasonic signals are amplified and demodulated or heterodyned to the audio range where an operator may listen to them on headphones connected by cable to the portable unit.

In an embodiment of the present invention the lubrication tool can be combined with an ultrasonic detector device so as to control the amount of lubricant applied to serviceable bearings, gear boxes and mechanical transmissions. The detector can be a standalone unit or integral with the lubrication tool. In such an arrangement the ultrasonic detector would have the on-board capability to make measurements that could be used to determine the lubrication needed for a bearing. It would include a lubricant flow monitor to measure and control the amount of lubrication (grease) that is being dispensed. Data on the amount of lubricant dispensed at any one time would be stored on board the ultrasonic device. Further information on the type of lubricant used can be stored along with the information on the amount of lubricant used for each bearing.

The lubrication tool could contain data from a master database with historical information including baseline readings, photos of machines, type of lubrication needed and recommended amounts. The database would identify the location of the machine with the suspect bearing, ensuring that the operator is at the correct location. This could be either an alphanumeric address or a photo.

The lubrication tool would further be able to listen to the bearing ultrasonically while lubricating it, thus ensuring the proper amount of grease is added. In particular, as the lubrication is added the friction forces will be reduced, which in turn will lead to a reduction in the amplitude of the ultrasonic signal.

According to an embodiment of the invention a digital spectrum analyzer is located on board the lubrication tool. This spectrum analyzer forms Fast Fourier Transforms of the demodulated or heterodyned audio signal. Thus, the operator can not only listen to the audio signal derived from the ultrasonic signal and observe the sound level, but the operator can observe the spectrum of the signal on a screen located on the portable device. This provides the operator with the ability to make very accurate judgments in real time about the status of the bearing without having to rely simply on his hearing.

In another embodiment of the present invention, a Bluetooth circuit converts the audio signal into short range wireless signals that can be picked up by a head set worn by the operator. This eliminates the need for a cable connecting the headphones to the portable unit.

In addition, one embodiment of the Bluetooth circuit may incorporate voice back and the headset may include a microphone. Thus, during a test an operator may make verbal comments, which pass from the microphone back through the Bluetooth connection to a data recorder in the hand-held unit. The data recorder may record the heterodyned audio signal created by the deteriorated bearings along with the operator's comments. These comments may include the operator's impression of the heterodyned audio, information about the environment in which the device is operating (e.g., heavy rain) or some suggestion about compensating for the faulty condition.

In a further embodiment the portable device may have a Wi-Fi circuit, so that longer range signal transmission can be effected. This may be used to rebroadcast the operator's comments to a local maintenance facility. In such a case the comments could be a request for a repair team to immediately replace faulty equipment.

It is a further improvement to use the Bluetooth and Wi-Fi connections to transmit recorded data to a base station or computer network. Additionally, the Bluetooth and Wi-Fi connections can be used to connect and exchange data with any wirelessly equipped data monitoring device.

A still further improvement that can be provided by the present invention is electronic storage on the lubrication tool or the ultrasonic detector for the recording of prior heterodyned audio signals and/or spectrums. As a result, the diagnoses of the fault condition can be even more precise because the heterodyned audio and/or spectrum at one or more past times can be compared in real time to the current heterodyned audio and/or spectrum on the portable device at the location of the test motor. Using the Bluetooth and Wi-Fi connections, a central maintenance operation can be immediately notified of an imminent fault detected in this manner.

As in prior systems, the present invention can be provided with a camera that allows a picture to be taken of the device under test. Unlike in the past, this picture can be made a part of a file for the device under test, which file is stored on the portable ultrasonic detector. The file would contain the ultrasound amplitude reading, a spectrum of the heterodyned audio, the operator's comments on the test and a picture of the actual device. The file can also contain past readings and spectrums. Further, the picture can have the current reading as an overlay. Such precise identification of the test results can help to reduce liability for a facility maintenance company. In particular, if it can be shown that the device was operating properly at the last test, the maintenance company's liability for a failure subsequent to that test may be reduced.

Photos may also help with lubrication and fault detection. By comparing the current image with a prior image, changes in the device under test can be noted. If one image is formed as a semitransparent overlay on the other, differences are more easily determined.

In order to improve the quality of the pictures taken with the camera, it can be provided with an LED flash unit. Also, the detector can be provided with a laser pointer to aid in precise aiming of the camera. The laser pointer can also be part of a distance measurement device so that pictures can be taken from the same distance on different occasions without much difficulty.

Typically when testing is being provided in a large facility, the operator is directed to make the tests over a particular route. Because of the images stored on the portable ultrasonic detector, route guidance can be visual, i.e., the operator's route can be set by a series of photos of where the operator is to go for the next test point.

Images and spectrums may be viewed on an LCD display screen provided on the portable ultrasonic detector. The LCD display screen may be a touch screen so that controls for operating the system may also be provided on the screen in the form of a graphical user interface. Thus the equipment can be used in dirty environments and the use of a touch screen can prevent fine dirt particles from damaging the controls.

Further, in addition to the display screen, the images can be transmitted via a wireless connection to a mobile device, such as an I-Phone or Blackberry. Thus the image would be available at a remote and mobile device. Such a device could be carried by a supervisor so that if an operator had a question about an image, it could be sent to the supervisor in real time for analysis of the status of the machine.

The storage of heterodyned audio, images and spectrums can be on removable media cards such as an SD or other removable media type. This allows information to be easily uploaded to a central computer or downloaded to the portable hand-held ultrasonic detector.

A still further embodiment includes an infrared temperature sensor. Frequently failing bearings have a higher temperature than devices operating normally. Thus, the temperature can be recorded to assist in failure prediction. The temperature measurement, like the other measurements can be stored in the file for the device under test and can be compared to prior measurements as a way of diagnosing failures. This infrared temperature sensor can be a spot pyrometer or an infrared image sensor.

Additional features, advantages, and embodiments of the invention may be set forth or apparent from consideration of the following detailed description, drawings, and claims. It is to be understood that both the foregoing summary of the invention and the following detailed description are exemplary and intended to provide further explanation without limiting the scope of the invention as claimed.

BRIEF DESCRIPTION OF THE DRAWINGS

The foregoing and following descriptions of the invention will be better understood by reference to the detailed description taken in conjunction with the accompanying drawings, in which.

DETAILED DESCRIPTION OF THE PREFERRED EMBODIMENT

Figure 1:
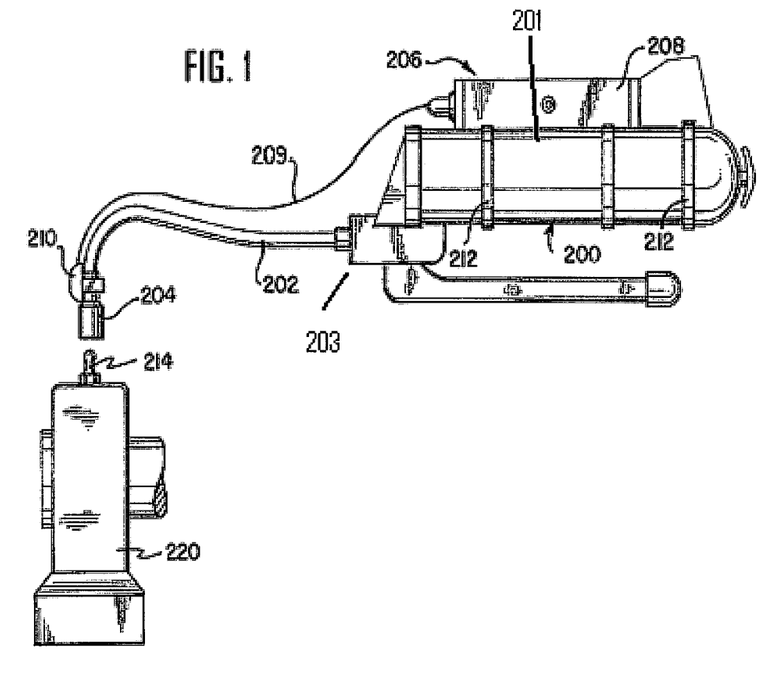
FIG. 1 is a diagram showing the portable lubrication tool and integrated ultrasonic detector.

Referring now to the drawings wherein like references numerals designate corresponding parts throughout the several views. In FIG. 1 the ultrasonic detector 206 is connected to the lubrication tool 200 (such as a grease gun), which has a neck 202 and a grease fitting adaptor 204. The ultrasonic circuitry is located in housing 208 which is attached to the body of grease gun 200 by, for example, Velcro® straps 212. Alternatively, housing 208 can be attached to grease gun 200 by clips, wire ties, or any other suitable means, such as welding and adhesives.

The ultrasonic transducer(s) is contained within housing 210 and is connected to the ultrasonic circuitry by wire 209. Transducer housing 210 attaches to grease gun 200 along neck 202 near grease fitting adaptor 204. However, the transducer can be attached by any other mechanism that places it in acoustical contact with grease fitting adaptor 204 or neck 202. Other ways to attach the transducer to the grease gun include a strap or a magnetic clip. Alternatively, neck 202 or grease fitting adaptor 204 can be specially constructed with means to securely receive a suitably shaped housing 210.

When a mechanical device is in use, internal friction results in the generation of ultrasound. As lubrication is applied and reaches the friction or ultrasound generating surfaces, the intensity of the generated ultrasound is reduced. Coupling an ultrasonic detector with a lubrication tool, such as a grease gun, allows a single user to apply lubrication to a mechanical device while simultaneously monitoring the intensity of ultrasonic energy generated by that device. This allows the user to see when the detected ultrasonic energy drops to its lowest level, and thus when enough lubrication has been applied.

The grease gun 200 can be used to lubricate serviceable bearing 220. Because bearing 220 is serviceable, there is normally no way to know when the proper amount of grease has reached the friction areas, such as the raceway and the ball bearings. Too much grease can build up the internal pressure of the bearing and cause damage or can "blow" the seal, allowing contaminants to get into the bearing. Too little grease can cause the bearings to overheat and seize due to excess friction. A similar problem occurs when lubricating other serviceable mechanical devices such as gear boxes or transmissions.

Figure 4:
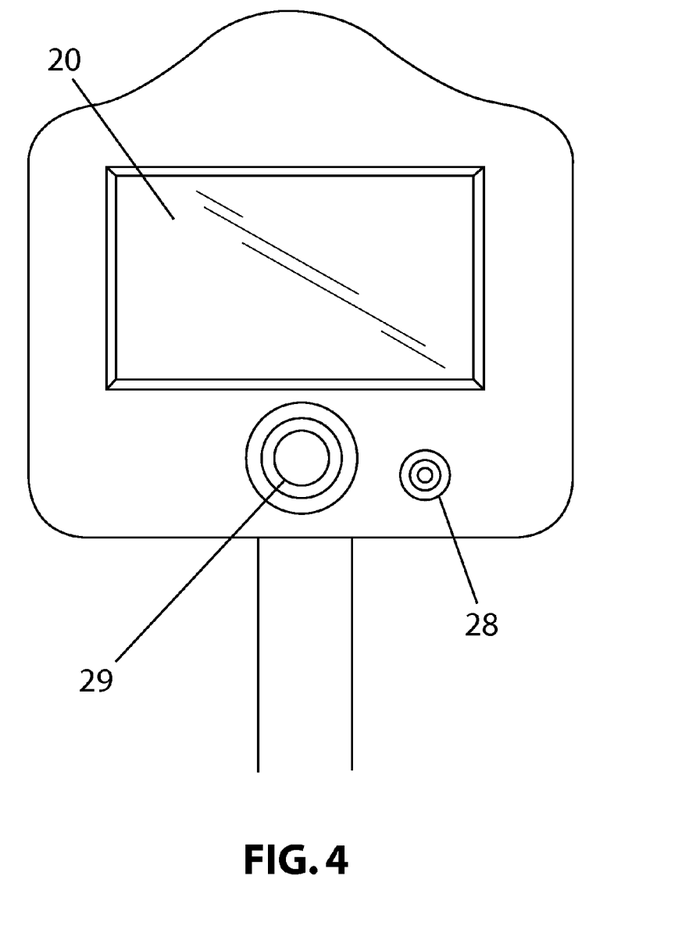
FIG. 4 is an enlarged rear elevation view of the portable hand-held ultrasonic detector according to the present invention, but disconnected from the lubrication tool.

In use, grease fitting adaptor 204 attaches to grease fitting 214 on bearing 220. Grease fitting adaptor 204 then acts as a wave guide, transmitting the ultrasound generated by serviceable bearing 220 to a transducer in housing 210. The flow of lubricant can be started by way of a start signal applied to the lubrication tool 200. This signal may be generated by a user operated trigger on the tool. As lubricant is applied, the level of ultrasound generated by bearing 220 is indicated visually on LCD touchscreen display 20 and audibly through headphones (not shown) connected to phone jack 28 (See FIG. 4) or wirelessly connected through the Bluetooth circuit.

Lubrication is packed into bearing 220 until the detected level of ultrasound is significantly reduced, an indication that enough lubricant has been applied. Since the detector can precisely measure the differences in amplitude of the ultrasonic signal, the user has the ability to prevent the bearing from being "over packed" and consequently blowing out the seal. However, more precise control can be achieved by a control, e.g., a microprocessor, which analyzes the available information and generates a stop signal applied to the lubrication tool 200 to cause the dispensing of the lubrication to stop. The grease gun/ultrasonic detector is designed to obtain and store data from a master database of historical information, including baseline db readings, heterodyned audio files, type of lubrication needed, recommended amounts of lubrication, amounts of lubricant dispensed in the past and recommended lubrication intervals of the bearings. The data may also contain information, e.g., a drawing, a photo or alphanumeric text, showing the correct points on the machine to be lubricated. The information may be displayed on an LCD touchscreen display 20 or on a remote display available to the operator such as a smart phone or portable computer. All of this information can then be compared manually or with the control unit to the real time indications developed by the device. Once downloaded the information may be stored on the device so as to save time by avoiding downloading in the future.

While dispenser 200 shown in FIG. 1 appears to be a single dispense, it is representative of one, two or more containers for different lubricants. Thus, if two particular bearings require two different lubricants, they can be accommodated with the present invention. Information about the type of lubricant required for each bearing may be stored in the unit or downloaded from a remote database.

The control unit of ultrasonic device is further capable of updating a database with information gained from the grease dispenser, such as the amount of grease available to dispense, the quantity of grease dispensed and/or the position and time of dispensing actions. This information can be wirelessly transmitted to a remote device, such as a smart phone (Blackberry or I-phone), or portable computer.

It is envisioned that previously stored data concerning the physical environment are available to control unit of the ultrasonic hand-held device. The device would be capable of providing structural and historical information, and has the capacity to take measurements of the environment. A still further embodiment includes infrared temperature sensor 19 (FIG. 2 (b)). Frequently failing bearings or arcing transformers have a higher temperature than devices operating normally. Thus, under the control of the processor or control unit the temperature can be recorded to assist in failure prediction. The temperature measurement, like the other measurements can be stored in the file for the device under test and can be compared manually or by the control unit to prior measurements as a way of diagnosing failures.

Figure 2A:
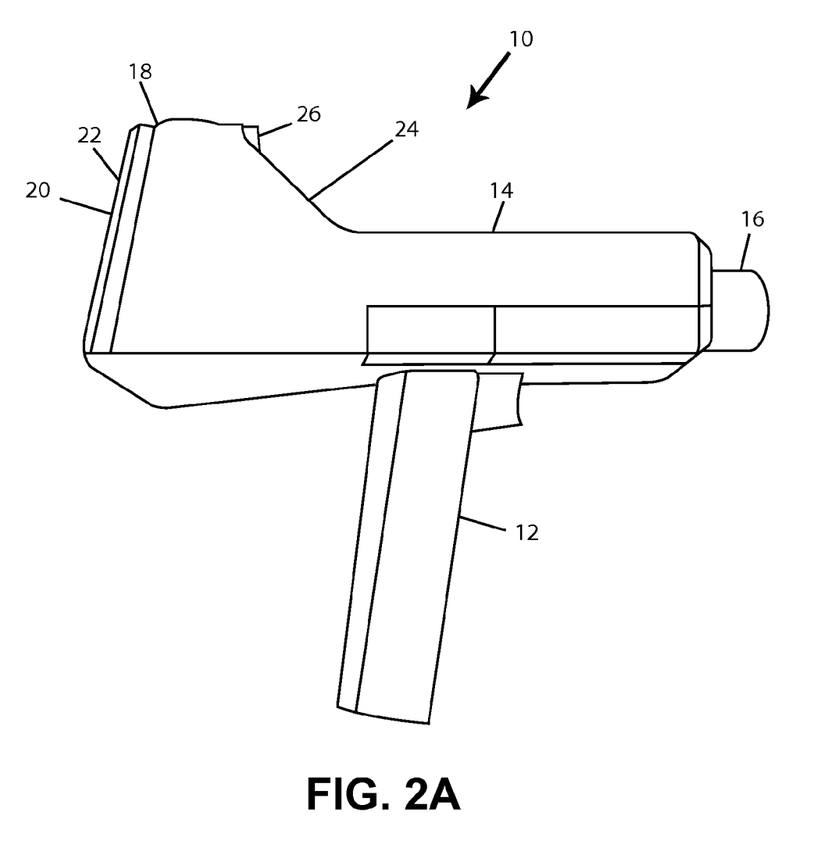
FIG. 2A is a side elevation view of the portable hand-held ultrasonic detector according to the present invention, but disconnected from the lubrication tool
Figure 2B:
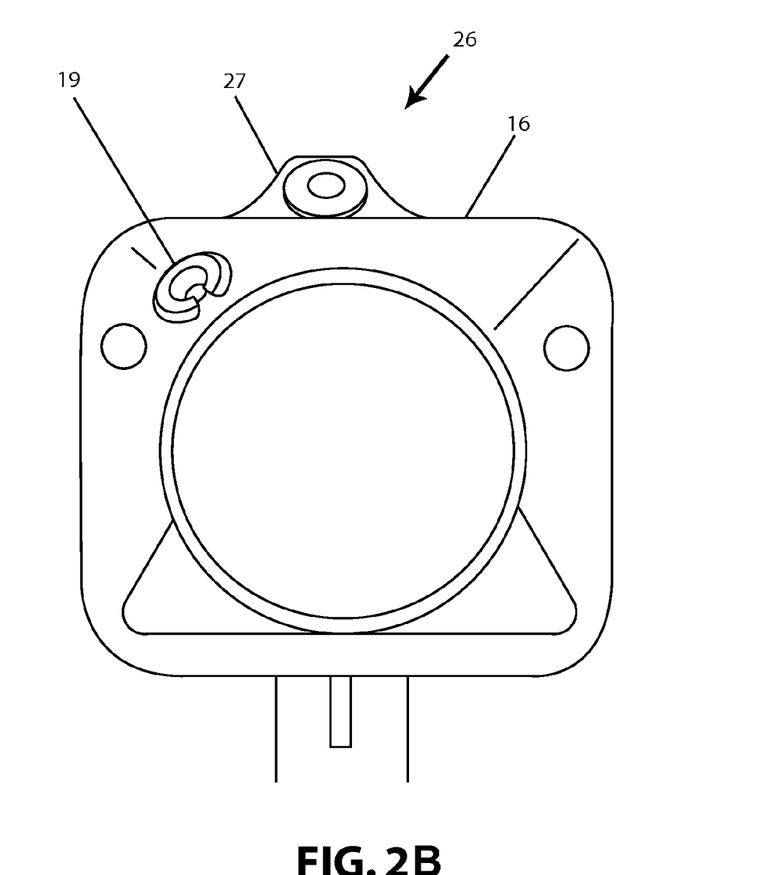
FIG. 2B is an enlarged front elevation thereof.

FIG. 2(a) is a side view of the portable hand-held ultrasonic detector portion 10 of the lubrication tool of the present invention. It includes a handle 12 with a main body 14 attached at its upper end. If in the combined tool shown in FIG. 1 a handle is provided on the lubrication tool, the handle 12 on the ultrasonic detector can be eliminated. The main body houses the circuits for the detector. At the front of the main body there is a housing 16 in which one or more ultrasonic detector transducers may be located. As an alternative, and as discussed above, the transducers may be located in the housing 210 and connected to housing 16 by wire 209 (See also FIG. 1). At the rear of the main body 14 is an enlarged portion 18 in which the touch screen display 20 is located (See also FIG. 4). In addition an SD memory chip 22 is located in a socket in the enlarged portion (FIG. 2(a)). The SD memory is used to store current and historical data on audio signals and spectra.

The front of the housing 16 contains the infrared sensor 19 that is used to measure the temperature of the motor and/or (See also FIG. 2 (b)).

Figure 5:
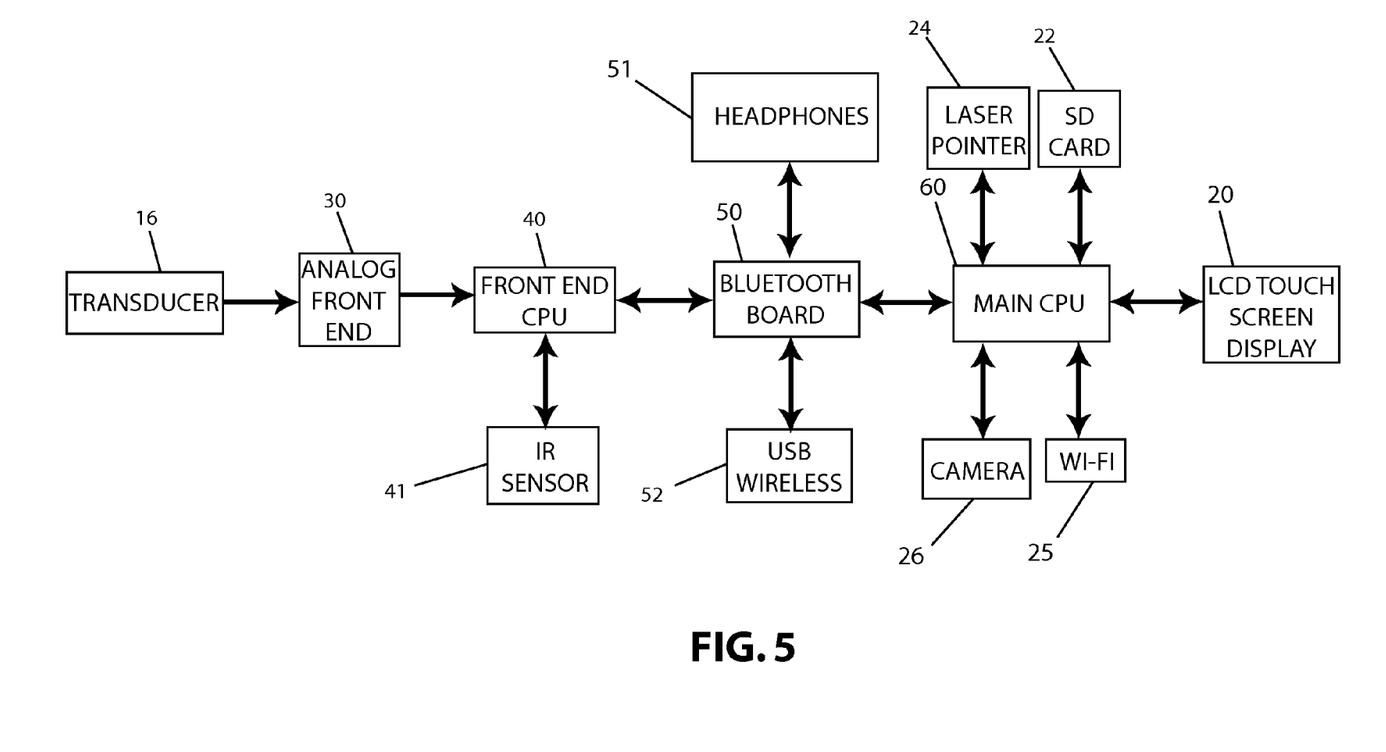
FIG. 5 is a block diagram of the circuits of the ultrasonic detector.

A block diagram of the circuits in the main body 14 that control the detector is shown in FIG. 5. Physically an analog front end circuit 30, a front end CPU circuit 40, a Bluetooth circuit 50 and a main control unit, i.e., CPU circuit 60, are stacked together and connected by a bus which carries the primary signals, such as the audio signal WAV.

The ultrasonic signal from bearings is picked up by the transducers and fed to the analog front end. In the front end 30 the signal is buffered, amplified and converted to a heterodyned audio signal WAY by heterodyne circuits. The front end CPU 40 is a sub-processor that carriers out detailed instructions from main CPU 60 (e.g., generating voltages to set the sensitivity and frequency in response to operator selection at the touch screen as interpreted by the main CPU) and otherwise passes the WAV signal to the Bluetooth circuit 50. The front end CPU also receives sensor signals, e.g., battery life signals and temperature signals from the IR temperature sensor 41, and sends them to the main CPU for analysis. The Bluetooth circuit 50 prepares the WAV signal for transmission to wireless headphones 51 and also passes it through to the main CPU. Further, the Bluetooth circuit provides a wireless USB port 52 for wide range communication of the WAV signal. The main CPU 60 controls all of the functions of the detector. It converts the WAV signal to a spectrum by performing a Fast Fourier transform on a portion of it. The outputs of the main CPU are displayed on touch screen 20. Further, it controls the laser pointer 24 (FIG. 2(a)) as well as stores data in and retrieves from SD memory 22. The camera and flash 26 (FIG. 3) are also controlled by the main CPU and receive images from the camera for display on screen 20 and storage in SD memory 22. A Wi-Fi module 25 can also be operated by the main CPU 60. Finally, once lubrication is started by the operator, the CPU 60 can determine automatically when to stop the lubrication to prevent over lubrication of the bearings.

Figure 6:
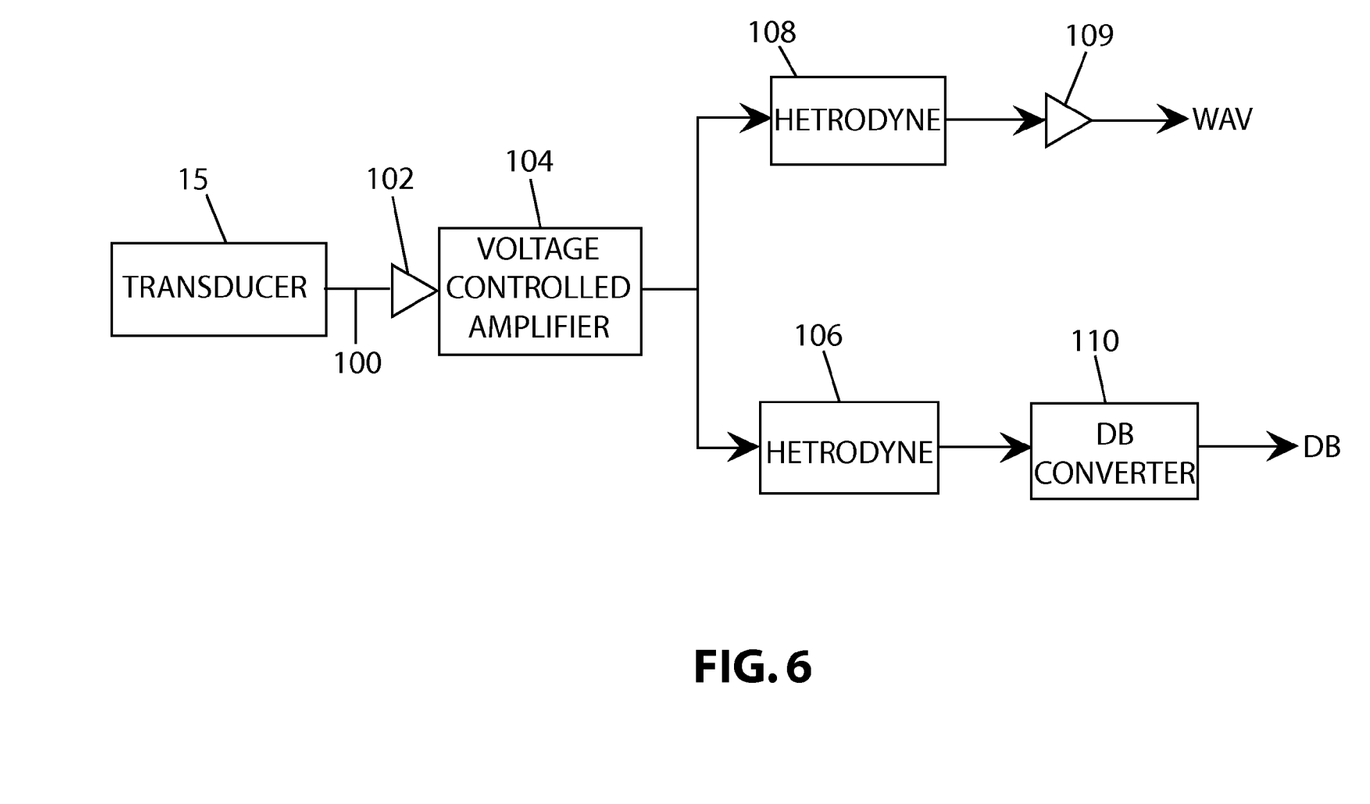
FIG. 6 is a block diagram of the analog front end of the ultrasonic circuit of FIG. 5.

FIG. 6 shows the analog front end of the portable hand ultrasonic detector of the present invention. This circuit is similar to that in the U.E. Systems UP 10,000 model detector as disclosed in U.S. Pat. No. 6,707,762. The transducer 15 is connected at the circuit input 100. The ultrasonic signal from the transducer 15 is buffered in amplifier 102 and passed through voltage controlled amplifier 104. The setting for amplifier 104 is controlled by the operator using the LCD touchscreen display 20. The LCD touchscreen display 20 signals are converted into digital signals by the main CPU 60 and its output sets the gain of this amplifier.

As in the UP 10,000, the ultrasonic signal is fed to first heterodyne circuit 106 and separately to second heterodyne circuit 108. The heterodyne circuits convert the ultrasonic frequency signal to an audio signal. The audio output of heterodyne circuit 106 is applied to the DB converter circuit 110, which generates a d.c. signal that is equivalent to the amplitude of the audio signal in db. This is applied to the main CPU 60, which displays the information on the screen 20.

Figure 7:
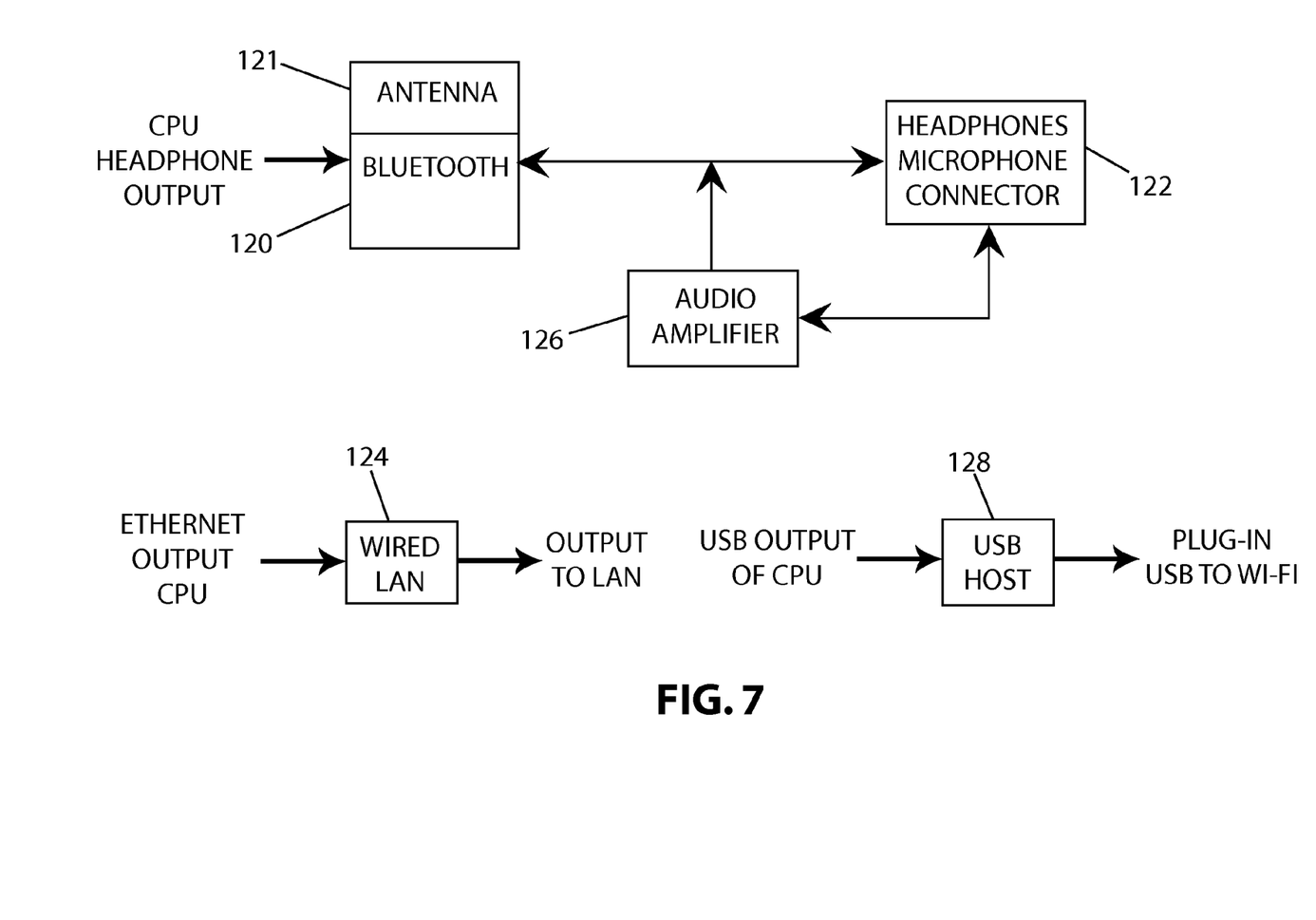
FIG. 7 is a block diagram of the Blue Tooth circuit of FIG. 5.

The Blue tooth circuit of FIG. 7 is connected to the headphone connector 122 of the main CPU. The signals are then directed to the Blue Tooth transmitting circuit 120, which has an antenna 121. Thus the signal can be broadcast a short distance using Blue Tooth protocol from the handheld unit to a Bluetooth earpiece or a Bluetooth speaker, either with a microphone or headphones. This circuit also includes a wired LAN circuit 124 which provides an Ethernet connection from the main CPU to an external computer on a local area network. Further, the circuit provides an auxiliary audio amplifier 126 which can amplify the headphone signal, if necessary, before applying it to the Blue Tooth circuit. If longer range connections are desired, a USB Host 128 is available as a plug-in Wi-Fi connection.

The second heterodyne circuit 108 produces the WAV which is used by the CPU to drive the headphones and is subject to spectrum analysis.

FIG. 5 shows the main CPU 60 receiving the WAV signal from Bluetooth board 50. It also has connections to the display 20, a real time clock 65 and two SD card slots in SD Card 22. One of the slots receives a high density SD card which provides system memory where WAV files can be stored along with photo images and spectrum signals. The main CPU controls all of the functions of the portable hand-held ultrasonic detector. In addition, it performs complex analysis of the WAV signal. For example, it can perform Fast Fourier Transforms on the WAV signal and can display the results on the LCD touchscreen display 20.

In operation the portable hand-held lubrication tool and integrated ultrasonic detector may be carried about a large facility by an operator checking to be sure that the serviceable bearings of motors, gear boxes, mechanical transmissions and devices of the like that emit ultrasonic energy, are operating correctly and are not likely to fail in the near future. Typically the operator will follow a set route about the facility. When the detector is turned on at the location of equipment generating ultrasonic signals, these signals are detected by transducers in the equipment. These ultrasonic signals are amplified and demodulated or heterodyned down to the audio range by the analog front end 30 so the operator may listen to them on headphones connected by cable to the portable unit. In one embodiment of the present invention, the Bluetooth circuit 50 converts the audio signal (WAY) into short range wireless signals that can be picked up by a wireless headset worn by the operator. This eliminates the need for a cable connecting the headphones to the portable unit.

In one mode of operation the handheld, lubrication dispensing apparatus includes a lubricant reservoir 201 as shown in FIG. 1 and a lubricant dispenser 203 for dispensing lubricant from the lubricant reservoir. The dispenser can be motor driven so that it can dispense lubricant without the operator having to use mechanical effort. The ultrasonic detection module 206 detects the amplitude of ultrasonic energy emitted by sealed bearings, gears and transmission when their parts are moving and produces a signal related thereto. Within the detection module 206 there is a control module, which includes the main CPU 60 (FIG. 5) that analyzes the amplitude of the signal from the ultrasonic detection circuit. When a signal is activated to lubricate the device, e.g., by the operator pulling a trigger, the processor causes the lubricant dispenser to automatically dispense lubricant onto the moving parts of the device. It can also cause the dispenser to stop when sufficient lubrication has been dispensed.

Also, within the module 206 there is a memory unit 22 that is utilized by the processor. Within the memory 22 there is stored a base value, i.e., the value of the detected amplitude of ultrasonic energy when the device is operating properly. After receiving the signal to lubricate the device and causing the dispenser to start the flow of lubricant to the device, the main CPU 60 compares the base value to the signal from the ultrasonic detection module when the parts are moving. Based on this comparison, the main CPU 60 causes the dispenser to cease the flow of lubricant when the signal substantially decreases. If the signal significantly decreases, it is a good indication that sufficient lubrication has been applied. Also, in the prior art the operator had to look at the signal on his display and make a judgment when the signal had significantly decreased. Then the operator had to manually turn off the dispenser. This could lead to errors which could result in damage to the bearings from over or under lubrication. By automating this process more precise results are achieved.

In the case where the signal stops decreasing before a base value is reached, there is an indication that the bearings are significantly deteriorated and simple lubrication will not cure the problem. Without the automatic detection according to the invention there is a danger that an operator would continue to lubricate the bearings, possible cause additional harm to the machine, and certainly wasting lubricant.

The ultrasonic level at which the signal increases a period of time after proper lubrication can be an indication of the stage of deterioration of the bearing. As indicated in applicant's U.S. Pat. No. 6,122,966 a reading of 8 dB about the base value may indicate a pre-failure stage, a reading of 16 dB may indicate the beginning of the failure stage, while a reading of 35-50 dB may indicate a catastrophic stage of deterioration requiring immediate replacement to avoid a highly dangerous condition. With the present invention these levels can be stored in memory 22 and the processor, in making its comparison, can direct a message to the display indicating the failure condition.

The apparatus may also incorporate a lubricant flow monitor that generates a flow signal and a lubricant reservoir monitor that generates a fill signal indicating the level of lubricant remaining in the reservoir. In such a case the processor can provide to the display a signal indicating the amount of lubricant left in the reservoir based on the fill signal and a signal indicating the flow of lubricant based on the flow signal. In addition to sending this information to the display, the processor can also send it to data transfer devices, e.g., the Bluetooth and Wi-Fi circuits so that it can be provided to a remote location. In this way a supervisor could monitor the use of lubricant and could send a full reservoir tank to a worker in the field.

In one embodiment of the invention the Bluetooth circuit may incorporate voice back and the headset may include a microphone. Thus, during a test an operator may make verbal comments, which pass from the microphone back through the Bluetooth connection to a data recorder in the hand-held unit 10. The data recorder may record the heterodyned audio signal created by the worn bearings along with the operator's comments. These comments may include the operator's impression of the heterodyned audio, information about the environment in which the device is operating (e.g., heavy rain) or some suggestion about compensating for the faulty condition.

Storage on the portable detector of prior heterodyned audio signals and/or spectrums is provided by removable memory cards such as SD memory cards 22. This allows information to be easily uploaded to a central computer or downloaded to the portable hand-held ultrasonic detector. As a result of this storage capacity, the diagnosis of the fault condition can be even more precise because the heterodyned audio and/or spectrum at one or more past times can be compared in real time to the current sound and/or spectrum on the portable device at the location of the test motor. Using the Bluetooth and Wi-Fi connections, a central maintenance operation can be immediately notified of an imminent fault detected in this manner.

Thus, the device of the present invention can measure the amount and type of lubricant dispensed for each bearing. Then it can store this information in the database on the tool or in a remote database or both. The average data from the historical database can then be used to control current dispensing of a particular measured amount of a specific type of grease. This stored data can be used to help reduce or eliminate the over lubrication of the bearings by the operator.

Figure 3:
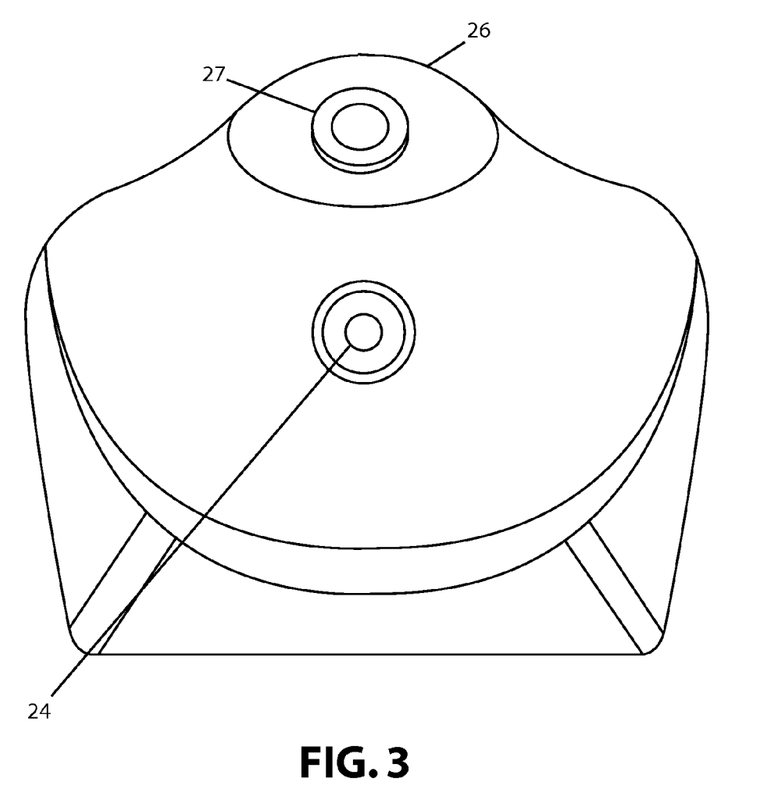
FIG. 3 is a further enlarged front upper perspective view of the portable hand-held ultrasonic detector according to the present invention, but disconnected from the lubrication tool.

The camera 26 allows a picture to be taken of the device under test. Unlike in the past, this picture can be made a part of a file of the device under test stored on the portable ultrasonic detector. This file would contain the sound level reading, a spectrum of the audio signal, the operator's comments on the test and a picture of the actual device. The file can also contain past readings and spectrums. The picture can have the current reading as an overlay.

In order to improve the quality of the pictures taken with the camera 26, it can be provided with an LED flash unit 27. Also, the detector can be provided with a laser pointer 24 to give precise aiming of the camera (FIG. 3). Further, the laser pointer can be part of a distance measurement device so that pictures can be taken from the same distance on different occasions without much difficulty.

The photos taken with camera 26 may also help with fault detection. By comparing the current image with a prior image, changes in the device under test can be noted. If one image is formed as a semitransparent overlay on the other, differences are more easily determined. Providing images to a user allows for a baseline image to be taken regarding the original condition of the machine. It is envisioned that these images can be combined in a composite overlay so as to produce visual time-lapsed changes of the machine under analysis over time. This provides visual information demonstrating the trending condition of both the machine and the diagnostic tests over time.

A view of images and spectrums may be on an LCD screen 20 provided on the portable ultrasonic detector. The LCD screen may be a touch screen so that controls for operating the system may also be provided on the screen in the form of a graphical user interface. The equipment can thus be used in dirty environments, since the use of a touch screen can prevent fine dirt particles from damaging the controls. The Wi-Fi and Bluetooth functions also provide the invention with the ability to connect with any wirelessly equipped stand-alone information recording device. By way of a non-limiting example, the present invention can share data and control the functions of an optical or strobe tachometer, IR camera, vibration analyzer or any other device configured for environmental sensing. As such, data gathered by the diagnostic tool prior to or during a maintenance operation can be stored or accessed via a network communication from any network accessible device. Thus, the information from these various external sources can be combined into a single source of information at the detector.

It is envisioned that a user of the invention will have access to a storage facility with a database via a network. Through that access, the user can then transmit continuous data to the network for remote analysis or storage. It is further envisioned that the database will have selectable data entries that will be available to the user for uploading or collaborating on data captured by the present invention.

Another feature of the present invention is the capability to locally transmit data via an ad-hoc network to PDAs, smart phones, netbooks, tablets, or other data display and processing platforms. It is also envisioned that the data generated by the claimed invention can be accessed or remotely viewed via mobile platforms.

It is envisioned that the data captured and transferred to a local or remote storage device can be, without limiting the disclosure thereof, heterodyned audio data, temperature data, spectrographic data, visual information, video data, directional and vibration data or any configured mechanism to capture data on physical conditions and phenomena. By way of non-limiting example, either local or networked data can be provided to the hand-held device and be used to continuously adjust user feedback systems for devices that have variable parameter, such as changing temperature gradients, variable speeds, etc. For example the tempo or cadence of an alarm can be controlled in order to correspond to the variable conditions within a device to be analyzed.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

The invention claimed is:

1. A handheld, lubrication dispensing apparatus for lubricating bearings of a machine with moving parts, comprising:
    a lubrication dispensing device capable of dispensing lubrication upon receipt of a start signal and ceasing lubrication upon receipt of a stop signal;
    a lubrication flow sensor to measure an amount of lubrication dispensed from the dispensing device and output information related to the measured amount of lubrication dispensed as data;
    a database, the data from the lubrication flow sensor being stored in the database;
    an ultrasonic detection device which detects an amplitude of ultrasonic energy emitted by the machine when its parts are moving and produces a signal related thereto;
    a control module which analyzes the amplitude of the signal from the ultrasonic detection device and determines, in real time, a necessary amount of lubrication that needs to be dispensed in order to properly lubricate at least one of said bearings, said control module being configured to use the data from the lubrication flow sensor, to determine when the necessary amount of lubrication has been dispensed from the lubrication dispensing device to properly lubricate the machine, and to provide the stop signal to the lubrication dispensing device when the necessary amount has been dispensed.

2. The lubrication dispensing apparatus of claim 1, wherein the lubrication dispensing device is further characterized as having a reservoir for holding the lubrication.

3. The lubrication reservoir of claim 2, wherein the reservoir is configured to hold a plurality of different lubrication types without mixing said different lubrication types.

4. The lubricant dispensing apparatus of claim 1, wherein the lubrication flow sensor is integral to the lubrication dispensing device.

5. The lubrication dispensing apparatus of claim 1, wherein the lubrication dispensing device is configured to cease the dispensing of the lubrication, automatically, depending on the signal produced by the ultrasonic detection device.

6. The lubrication dispensing apparatus of claim 5 wherein the control module further comprises a programmed processor and a storage memory, the value of the detected amplitude of the ultrasonic energy when the machine is operating properly being stored in said memory as a base value, and after receiving the signal to lubricate the machine and causing the dispensing device to start a flow of the lubrication to the machine, said processor compares the base value to the signal produced by the ultrasonic detection device when the parts are moving, and causes the dispensing device to cease the flow of the lubrication when the amplitude of the signal substantially decreases.

7. The lubrication dispensing apparatus of claim 6, wherein the lubrication dispensing device further comprises a display, a lubrication flow monitor that generates a flow signal and a lubrication reservoir monitor that generates a fill signal, wherein said processor provides to the display, a signal indicating the amount of the lubrication left in the reservoir based on the fill signal and a signal indicating the flow of the lubrication based on the flow signal.

8. The lubrication dispensing apparatus of claim 7, wherein the control module is updated in real time as to the current level of lubrication stored in the lubrication reservoir.

9. The lubrication dispensing apparatus of claim 7, wherein the control module is updated in real time as to the measured flow of lubrication dispensed by the dispensing device.

10. The lubrication dispensing apparatus of claim 7 wherein the display is a touch screen display device.

11. The lubrication dispensing apparatus of claim 7, further including at least one data transfer device, and wherein the processor is configured to display data on a touch screen as well as to transmit the data to an external wireless device, such as a PDA or smart phone, through the data transfer device, the data including the amount of lubrication left in the reservoir and the flow of the lubrication.

12. The lubrication dispensing apparatus of claim 6, wherein the processor further comprises a CPU, at least one removable storage device, and at least one data transfer device.

13. The lubrication dispensing apparatus of claim 12, wherein the at least one data transfer device is at least one of Bluetooth, WiFi, and other Radio frequency (RF) based circuitry.

14. The lubrication dispensing apparatus of claim 13, wherein the data transfer device is capable of accessing stored data on at least one of a local network or through the internet, said stored data including base value information of a plurality of machines with moving parts.

15. The lubrication dispensing apparatus of claim 12, wherein the removable storage device is a digital memory card.

16. The lubrication dispensing apparatus of claim 5, wherein the control module includes a digital spectrum analyzer that analyzes the ultrasonic signal.

17. The lubrication dispensing apparatus of claim 1 wherein the machine to be lubricated comprises serviceable bearings, gear boxes and/or mechanical transmissions.

18. The lubrication dispensing apparatus of claim 1 further including a storage device for storing historical information about the bearings of the machine, including the amplitude of prior ultrasonic signals and the amount of lubrication previously used on a particular bearing of said bearings, wherein the control module also analyzes an amplitude of the prior ultrasonic signals for the particular bearing in determining when the necessary amount of the lubrication has been dispensed.

19. The lubrication dispensing apparatus of claim 18 wherein said storage device also stores information about a type of lubricant required for the particular bearing, wherein the lubrication dispensing device is capable of dispensing more than one type of lubrication and the control module determines the type of lubrication to be dispensed based on the particular bearing being lubricated and the historical information in the storage device.

20. The lubrication dispensing apparatus of claim 18 wherein the stop signal is generated when the historical information indicates that sufficient lubrication has been dispensed, regardless of the signal received from the ultrasonic detection device.

21. A method of using a handheld, lubrication dispensing apparatus for lubricating bearings of a machine with moving parts, the method comprising the steps of:
    detecting an amplitude of ultrasonic energy emitted by said machine when its parts are moving, and generating an ultrasonic signal related thereto;
    analyzing the ultrasonic signal with a control module, which determines, in real time, the necessary amount of lubrication that needs to be dispensed in order to properly lubricate at least one of said bearings;
    storing a value of the generated ultrasonic signal when the machine is operating properly as a base value, in a database;
    initiating a flow of lubrication to the bearings in response to a lubricate signal when an amplitude of the ultrasonic signal is above the base value;
    measuring an amount of lubrication dispensed from the dispensing device, with a lubrication flow sensor, and outputting information related to the measured amount, as data, which is then stored in the database;
    using the data from the lubrication flow sensor to determine when a necessary amount of lubrication has been dispensed to properly lubricate at least one of said bearings; and
    causing the flow of lubricant to automatically cease when the necessary amount has been dispensed.

* * * * *